(12) United States Patent
Bhatt et al.

(10) Patent No.: US 8,667,580 B2
(45) Date of Patent: Mar. 4, 2014

(54) SECURE BOOT SCHEME FROM EXTERNAL MEMORY USING INTERNAL MEMORY

(75) Inventors: Dhiraj Bhatt, Portland, OR (US); Eric Auzas, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1738 days.

(21) Appl. No.: 10/988,913

(22) Filed: Nov. 15, 2004

(65) Prior Publication Data

US 2006/0107320 A1     May 18, 2006

(51) Int. Cl.
     *G06F 11/00*     (2006.01)
(52) U.S. Cl.
     USPC ........ 726/22; 726/2; 726/26; 726/27; 726/34; 713/2; 713/182; 713/189; 713/190; 713/191; 713/192; 713/193; 380/28; 380/29
(58) Field of Classification Search
     USPC ........ 727/22, 2; 713/200, 1–2, 182, 189–193; 380/28, 29, 2; 726/2, 26–27, 34
     See application file for complete search history.

(56) References Cited

U.S. PATENT DOCUMENTS

| | | | | |
|---|---|---|---|---|
| 5,805,711 | A * | 9/1998 | Windel et al. | 380/55 |
| 5,937,063 | A * | 8/1999 | Davis | 713/187 |
| 6,791,157 | B1 * | 9/2004 | Casto et al. | 257/529 |
| 2002/0144104 | A1 * | 10/2002 | Springfield et al. | 713/2 |
| 2003/0084316 | A1 * | 5/2003 | Schwartz | 713/200 |
| 2004/0003209 | A1 * | 1/2004 | Mitsuishi et al. | 712/225 |
| 2004/0107309 | A1 * | 6/2004 | Iida et al. | 711/103 |
| 2004/0184605 | A1 | 9/2004 | Soliman | |
| 2004/0221044 | A1 * | 11/2004 | Rosenbloom et al. | 709/227 |
| 2005/0076226 | A1 * | 4/2005 | Boivie et al. | 713/187 |
| 2005/0267949 | A1 * | 12/2005 | Scott, III | 709/219 |
| 2005/0283601 | A1 * | 12/2005 | Tahan | 713/2 |
| 2006/0265446 | A1 * | 11/2006 | Elgressy et al. | 709/200 |

FOREIGN PATENT DOCUMENTS

| | | | |
|---|---|---|---|
| EP | 0 656 587 A1 | 6/1995 | |
| EP | 656587 A1 * | 6/1995 | G06F 11/00 |
| EP | 1 387 237 A2 | 2/2004 | |

OTHER PUBLICATIONS

European Patent Office, International Search Report and Written Opinion for International Application No. PCT/US2005/040443, 12 pages, Mar. 2, 2006.
Taiwan Patent Office, Office Action issued in corresponding Taiwan Application No. 95112976, 21 pages, Nov. 4, 2008.

* cited by examiner

*Primary Examiner* — Luu Pham
*Assistant Examiner* — Canh Le
(74) *Attorney, Agent, or Firm* — Trop, Pruner & Hu, P.C.

(57) ABSTRACT

A system may include a memory having a unique identifier that uniquely identifies the memory. A package may be communicatively coupled to the memory. The package may include a processor, an identifier storage, and a boot storage. The identifier storage may store the unique identifier from the memory. The boot storage may include instructions to control booting of the processor based on the unique identifier in the identifier storage.

4 Claims, 3 Drawing Sheets

SECURE BOOT SCHEME FROM EXTERNAL MEMORY USING INTERNAL MEMORY

BACKGROUND

Implementations of the claimed invention generally may relate to security verification and, more particularly, to preventing software modification via secure booting.

In certain applications, it may be desirable to prevent unauthorized modification of software, for example to protect high-value content and/or service provider revenue. One scheme that has been proposed to prevent such unauthorized modification is to "securely boot" from a trusted (e.g., assumed uncorrupted) source to ensure that software is not or has not been modified. Such secure booting may ensure data security itself, or it may trigger subsequent verification in a so-called "chain of trust."

One way to design a secure boot scheme may be for a processor to read trusted boot code from an external memory device, such as non-volatile, flash-type memory. Such boot code may reside, for example, in a one-time programmable (OTP) area of the external memory device. Such one-time programmability may prevent overwriting of the trusted boot code.

Such an external memory device, however, may be vulnerable to a replacement attack, where the external memory may be removed and replaced with a different memory device containing modified boot code.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
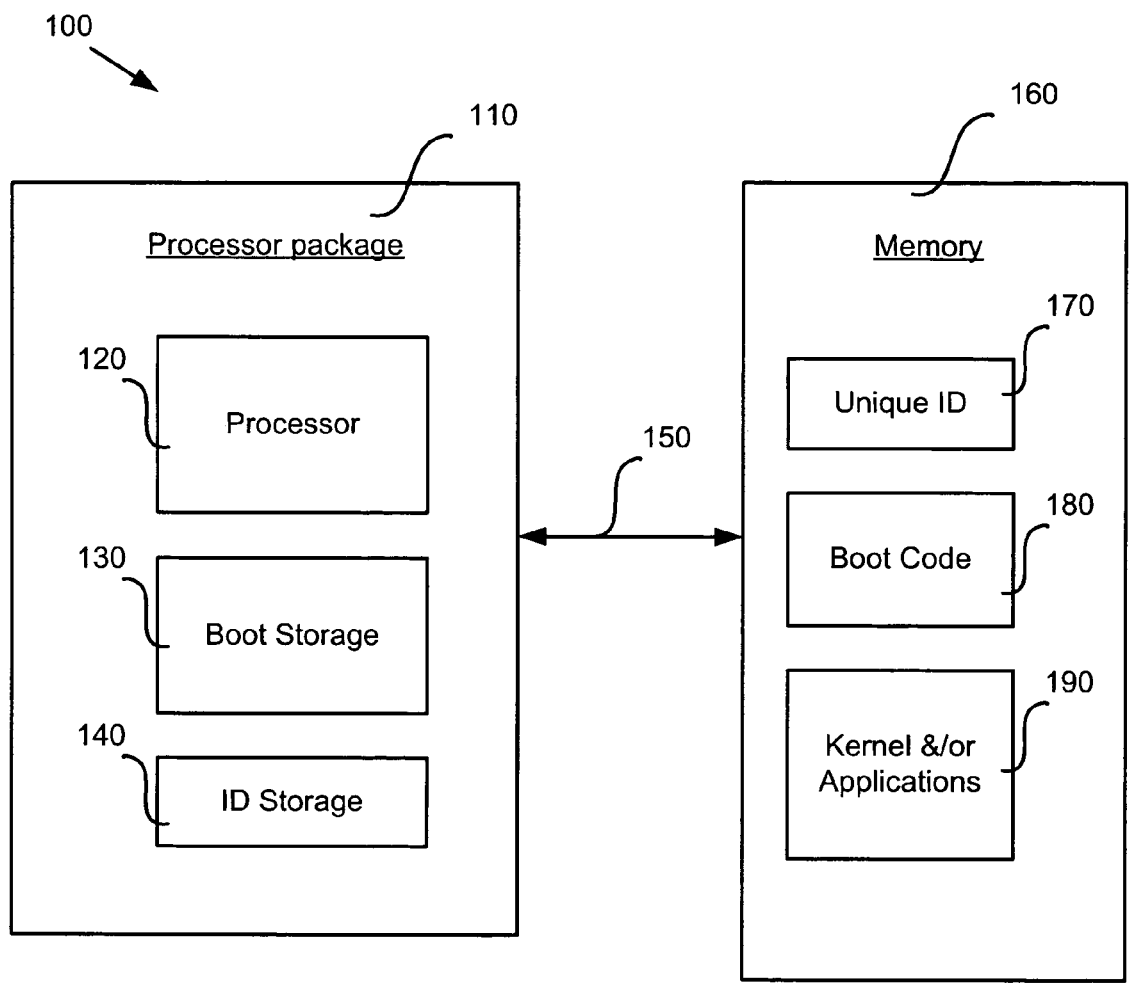
FIG. 1 illustrates an example processing system.

FIG. 1 illustrates an example processing system 100. Processing system 100 may include a processor package 110, a communication link 150, and a memory 160. Processor package 110 and memory 160 may, in some implementations, be located proximately on a single circuit board. In some implementations, package 110 and memory 160 may be more remotely situated within system 100. Memory 160 may be referred to or conceptualized as an "external" memory, because it may be external to package 110.

Processor package 110 may include a processor 120, a boot storage 130, and an identifier (ID) storage 140. In some implementations, processor 120, boot storage 130, and ID storage 140 may be located on the same die and/or semiconductor substrate. In some implementations, processor 120, boot storage 130, and ID storage 140 may be located on different dies and/or chips that are packaged together. In some implementations, processor 120 and boot storage 130 may be located on the same die and/or semiconductor substrate, and ID storage 140 may be located on a different die and/or chip that is packaged with that of processor 120. Other variations are both possible and contemplated.

Processor 120 may include a general-purpose or special-purpose processor configured to execute instructions or series of instructions to operate on data. In some implementations, processor 120 may be a general-purpose processing element that may execute instructions stored in boot storage 120 and/or in memory 160.

Boot storage 130 may include a non-volatile memory, such as a read-only memory (ROM). In some implementations, boot storage 130 may store some portion of the boot code for initializing and establishing operational parameters of processor 120. In some implementations, boot storage 130 may include security verification code for verifying one or more properties of memory 160 before further booting may occur. In some implementations, boot storage may be about 200 Bytes to about 10 kilobytes in size, although smaller or larger sizes are possible.

ID storage 140 may include a non-volatile memory, such as a one-time programmable (OTP) flash memory. In some implementations, ID storage 140 may include an electrically erasable programmable read-only memory (EEPROM), such as a serial EEPROM. In some implementations, ID storage 140 may include a bank of fuses that may be blown during manufacturing to store information.

ID storage 140 may be arranged to store identification information about memory 160. In some implementations, where a relatively small amount of information (e.g., a single identifier) is to be stored in ID storage 140, it may be around 32 bits in size. Slightly larger sizes for ID storage 140 are also possible, such as 128 bits or 256 bits. In some implementations, where a larger amount of information (e.g., an identifier and other information, such as a cryptographic signature) is to be stored, ID storage may be larger (e.g., around 160 bits to several kilobytes in size).

Communication link 150 may connect processor package 110 and memory 160. Although illustrated as a single bidirectional arrow, communication link may include one or more busses and/or point-to-point connections between processor package 110 and memory 160. In some implementations, communication link 150 may be implemented via conductive traces and/or wires. In some implementations, link 150 may be implemented in a non-conductive manner (e.g., optically and/or wirelessly).

Memory 160 may include a unique identifier (ID) 170, a boot code portion 180, and a portion for storing kernel and/or application code 190. In some implementations, unique ID 170 and/or boot code 180 may be stored in OTP portions of memory 160. Memory 160 may include flash-type or other nonvolatile memory including OTP and/or many-times programmable portions.

Unique ID 170 may be programmed into memory 160 when memory 160 is manufactured. In some implementations, unique ID 170, once programmed into memory 160, may not be rewritten or overwritten. In some implementations, unique ID 170 may be less than, for example, about 128 bits. Unique ID 170 may be sufficiently long, however, to make accidental duplication of the ID unlikely.

Boot code 180 also may be programmed into memory 160 when memory 160 is manufactured. In some implementations, boot code 180, once programmed into memory 160, may not be rewritten or overwritten. Boot code 180 may include a remainder of code needed to boot processor 120, in addition to a security verification portion of the initializing code that may be stored in boot storage 130. In some implementations, boot code 180 may also include verification code to verify the integrity of, for example, kernel and/or applications 190.

Kernel and/or applications 190 may include code and/or instructions to be executed by processor 120 after boot code 180. Kernel and/or applications 190 may include instructions that define a "steady state" functionality of system 100. For example, if system 100 is included in a set-top box, kernel and/or applications 190 may include an operating system and/or tuner software and/or a program guide to control playback of media information.

Figure 2:
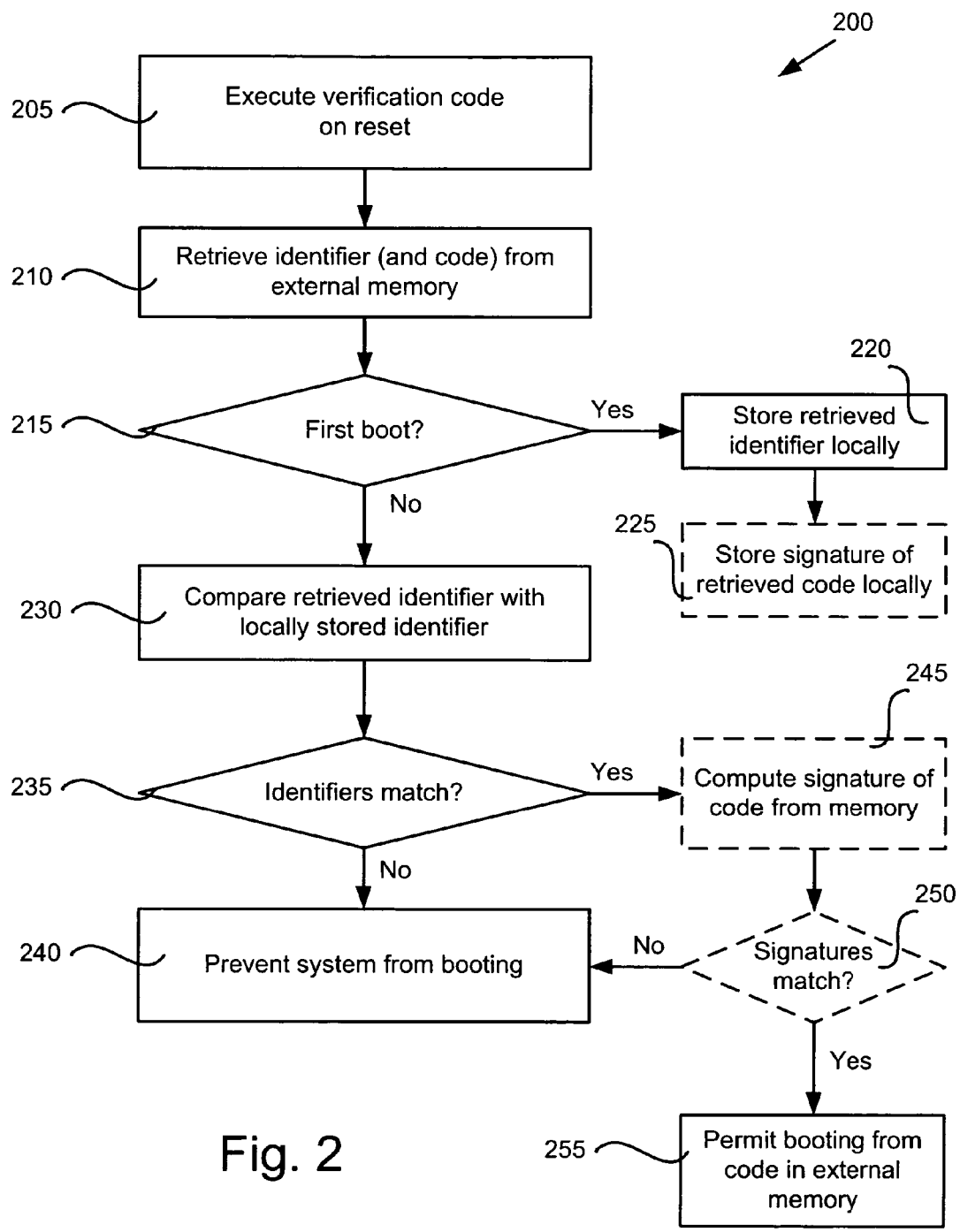
FIG. 2 is a flow chart illustrating a process of securely booting a processor.

FIG. 2 is a flow chart illustrating a process 200 of securely booting processor 120. Although FIG. 2 may be described with regard to system 100 for ease and clarity of explanation, it should be understood that process 200 may be performed by other systems than the specific system 100 illustrated in FIG. 1.

Processing may begin with processor 120 executing verification code stored in boot storage 130 [act 205]. In some implementations, act 205 may occur on a system reset and/or restart or startup. The verification code may direct processor 120 to perform some or all of acts 210-255 in FIG. 2.

Processing may continue with processor 120 retrieving at least unique ID 170 from memory 160 via communication link 150 [act 210]. In some implementations, processor 120 may send a particular command sequence to memory 160 to read unique identifier 170. For example, the design of memory 160 may necessitate a specific sequence of commands to be sent before unique ID 170 may be obtained. Such a sequence may be similar to those used to get status or write to typical flash memory devices. In some implementations, processor 120 may also retrieve a portion (e.g., some or all) of boot code 180 from memory 160 in act 210. In some implementations, processor 120 may optionally retrieve a portion of kernel and/or applications 190 in addition to boot code 180. Such optional retrieval of boot code 180 (and, optionally, kernel and/or applications 190) may facilitate optional acts 225, 245, and/or 250 (illustrated by dashed lines) described below. Although such acts may be described with regard to boot code 180 for ease of presentation, it should be understood that optional acts 225, 245, and/or 250 may also involve kernel and/or applications 190.

If it is the first time processor 120 has executed the verification code from boot storage 130 [act 215], processor may store unique ID 170 locally in ID storage 140 [act 220]. As previously mentioned with regard to FIG. 1, act 220 in ID storage 140 may be an OTP-type storage operation. In some implementations, act 220 may be performed by the manufacturer of system 100 during manufacture and/or assembly of system 100.

Optionally, if processor 120 has retrieved a portion of boot code 180 in act 210, processor 120 may compute a cryptographic hash or digital signature (or otherwise generate a unique identifier) on boot code 180 and also locally store the resultant hash or signature, herein referred to as 'signature' in ID storage 140 [act 225]. Any now-known or later-developed hashing (such as MD-5, SHA-1) or similar algorithm such as a Message Authentication Code (hashing algorithm which uses a secret key, such as HMAC-MD5, HMAC-SHA-1) or a Digital Signature algorithm (such as RSA, DSA, El-Gamal etc) may be stored in boot storage 130 and used in act 225. Message Authentication Codes (MACs), which may be referred to as keyed hashes, may provide greater security in some implementations than non-keyed hashes, because knowledge of the key is implied. Acts 220, and optionally 225, may "bind" external memory 160 to processor package 110 during manufacturing and/or before the opportunity for a memory replacement attack on system 100.

On subsequent executions of verification code [act 215], processor 120 may compare unique ID 170 from external memory 160 with a corresponding identifier in ID storage 140 [act 230]. If the identifiers do not match [act 235], the verification code executed by processor 120 may prevent further booting [act 240]. In such a case, processor 120 may not execute boot code 180, because the identity or trustworthiness of memory 160 is suspect. In some implementations, processor 120 may issue an error code or other notification to the remainder of system 100 that booting has stopped in act 240.

If the identifiers match [act 235] and if a signature of boot code 180 is also present in ID storage 140, the verification code executed by processor 120 may compute a signature of the boot code 180 (and/or other code) read from memory 160 in act 210 [act 245]. The signature algorithm performed on boot code 180 from memory 160 may be the same as the algorithm used in act 225. If the computed signature from act 245 does not equal the corresponding signature value from ID storage 140 [act 250], the verification code executed by processor 120 may prevent system 100 from booting further [act 240], as previously described.

If the computed signature from act 245 matches the corresponding signature value from ID storage 140 [act 250], processor 120 the verification code executed by processor 120 may permit further booting from boot code 180 in external memory 160 [act 255]. In some implementations, boot code 180 may include the remainder of all boot code beyond the verification portion that is stored in boot storage 130. In some implementations, boot code 180, having been verified in act 250, may proceed to verify other code in memory 160, such as kernel and/or applications 190. In some implementations, boot code 180 may load kernel and/or applications 190 for further execution by processor 120.

It should be noted that in implementations that do not include a signature of boot code 180, when identifiers match in act 235, processor may permit booting from boot code 180 in act 255. In other words, when acts 245 and 250 are not present and/or performed, act 255 may follow act 235 when appropriate.

Figure 3:
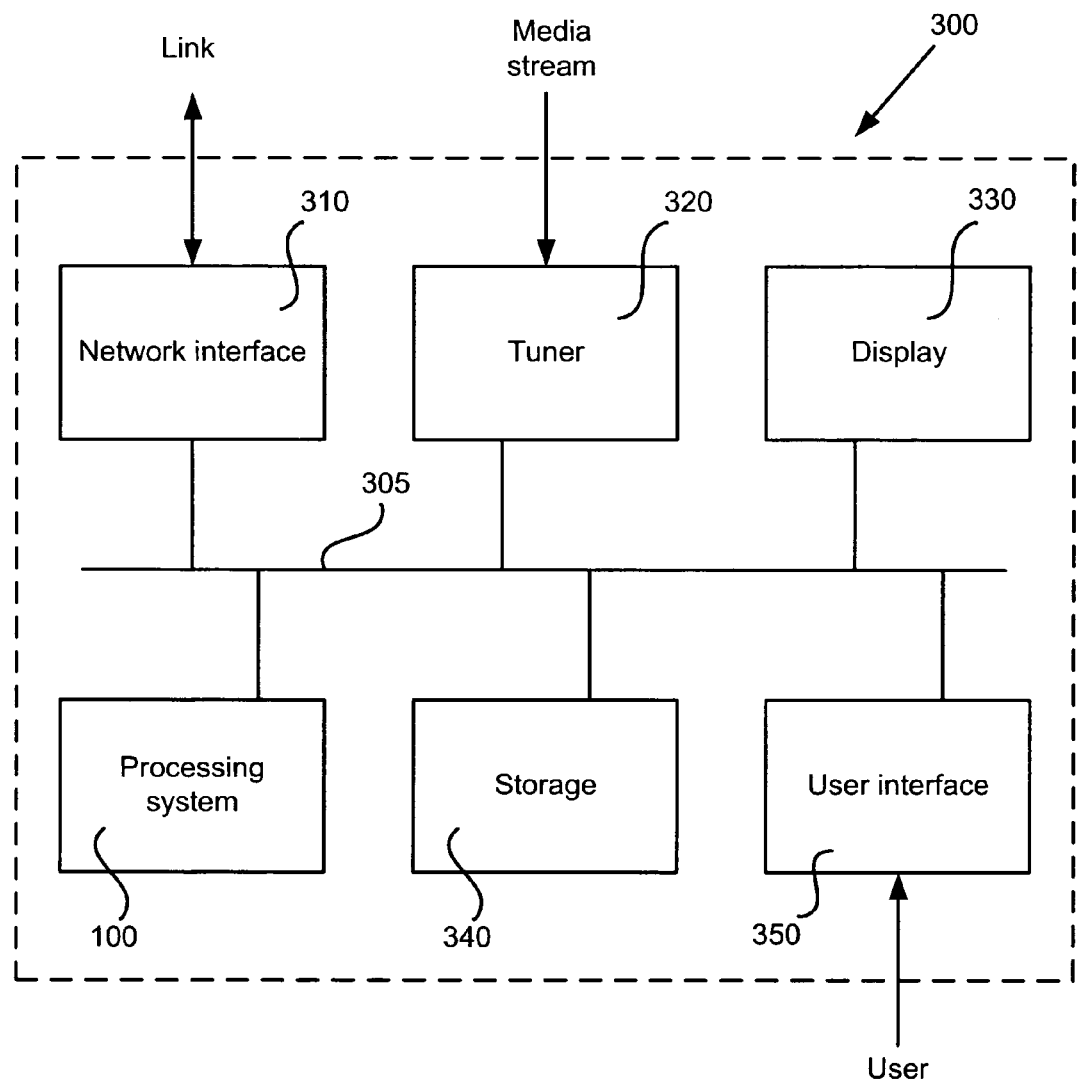
FIG. 3 illustrates an example system that may include the processing system of FIG. 1.

FIG. 3 illustrates an example system 300 that may include processing system 100. In some implementations, system 300 may include a set-top box for interfacing with cable/satellite/internet protocol (IP)-based networks. In some implementations, system 300 may include a more general-purpose computing or processing system and components thereof. System 300 may include at least some of a network interface 310, a tuner 320, a display 330, processor system 100, storage 340, and a user interface 350 connected by at least one bus 305. Although system 300 may include some or all of elements 310-350, it may also include other elements that are not illustrated for clarity of explanation. Further, elements 310-350 may be implemented by hardware, software/firmware, or some combination thereof, and although illustrated as separate functional modules for ease of explanation, elements 310-350 may not be implemented as discrete elements within system 300.

Further, some systems 300 may not include certain ones of elements 310-350. In some implementations, system 300, for example, may lack storage 340. Other systems 300, such as server-type systems, may lack one or more of tuner 320, display 330, and/or user interface 350.

Network interface 310 may be arranged to transmit and receive data via one or more communication links. In some systems 300, network interface 310 may function as a switch or router, but in other systems 300, network interface 310 may function as an access point. Network interface 310 may be arranged to facilitate communication via any associated communication link(s). For example, if the associated communication links include a wireless link, network interface 310 may include circuitry and optionally an antenna arranged to send and receive wireless signals. Conversely, if the communication link include a wired link (including wires or other physical conduits such as optical fibers), network interface 310 may include circuitry and a connector arranged to send and receive signals via a wire, cable, fiber, or the like.

Tuner 320 may include one or more devices that are arranged to separate one or more streams of information (e.g., television channel(s)) from an input media stream. Tuner 320 may also include a physical interface to receive a transport medium (e.g., a coaxial cable, Ethernet cable, wireless connection, etc.) that carries the media stream. Tuner 320 may lock onto and output a first stream of information, such as a television channel or other information, present at a first frequency range in the media stream. The particular choice of which first stream or channel to be output by tuner 320 may be made by a user via user interface 350 or by processing system 100.

Display 330 may include a television, monitor, projector, or other device suitable for displaying media information, such as video and/or audio. Display 330 may utilize a number of technologies for such displaying, including cathode ray tube (CRT), liquid crystal display (LCD), plasma, and/or projection-type technologies. In some situations, display 330 may receive media information to output from tuner 320. In other situations, display 330 may receive media information to output from network interface 310 and/or storage 340.

Processing system 100, after a successful booting process 200, may interact with storage 340 (if present) and/or tuner 320 and/or network interface 310 to store and/or play media information in accordance with, for example, kernel and/or applications 190. Processing system 100 may, for example, play or store media information to/from "local" storage 340 and/or tuner 320. In some cases, however, processing system 100 may play media information from, or store media information to, remote media systems via network interface 310, as will be described in further detail below.

In addition, processing system 100 may also perform other associated tasks in accordance with kernel and/or applications 190, such as encoding or decoding of media information before and/or after storage in storage 340 or transfer via network interface 310. For example, processing system 100 may convert media information to or from various formats, such as MPEG-1, MPEG-2, MPEG-4 (from the Moving Picture Experts Group), or any other known or later-developed media format. Processing system 100 may also control which channels of information in the media stream are selected by tuner 320.

Storage 340 may include a solid-state, magnetic or optical storage medium, examples of which may include semiconductor-based memory, magnetic hard disks, optical disks, etc. Storage 340 may be arranged to store instructions and/or programs for execution by processing system 100, as well as data products of the instructions and/or programs. Storage 340 may include random access memory (RAM), read only memory (ROM), flash memory, and may include other types of storage media, such as magnetic hard drives and (read-only or writable) optical media (e.g., compact discs (CDs), digital versatile discs (DVDs), etc.) and their associated optical drives.

User interface 350 may be arranged to supply input to a program on processing system 100 from a user. User interface 350 may include, for example, a keyboard, mouse, remote control, multi-purpose controller or similar device. Although shown directly connected to processing system 100 in FIG. 3, user interface 350 may, in some implementations, be functionally connected to processing system 100 via an intermediate device, such as display 330.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although processor 120, boot storage 130, and ID storage 140 have been described as being in a single package 110, one or more of these elements may be implemented in separate physical packages in desired. Similarly, although boot storage 130 and/or ID storage 140 have been described as read-only and/or OTP, in some implementations, one or more of storages 130 and 140 may be writable and/or programmable more than once. Also, in some implementations, boot storage 130 and/or ID storage 140 may be logical portions of the same physical storage device or structure. Moreover, in some implementations, some or all of boot code 180 may reside in boot storage 130, instead of in memory 160.

Further, although the loading of unique ID 170 into ID storage 140 has been described as happening on the first boot of processor 120 during manufacturing, this need not necessarily be the case. For example, in some implementations such loading of unique ID 170 may happen during second or subsequent boots of processor 120, perhaps in a deliberate operation, rather than automatically on first boot. Also, such loading of unique ID 170 need not necessarily be performed by the manufacturer of processor system 100, but rather may be performed by another entity, such as an integrator of system 100 (e.g., into system 300), and/or by a service provider at a later time.

In addition, as used herein "one time programmable" may refer to a certain element within a storage device, and not necessarily to the number of storage operations that may be performed to that device. For example, some percentage of the "one time programmable" elements in a device may be programmed at a certain time, and a remaining percentage of the "one time programmable" elements in the device may be programmed at a later time.

Moreover, the acts in FIG. 2 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A system, comprising:
a memory including
a unique identifier that uniquely identifies the memory; and
a semiconductor substrate or die communicatively coupled to the memory and including:
a processor,
an identifier storage to store the unique identifier, said storage being incapable of being reprogrammed,
a boot storage including instructions to control booting of the processor based on the unique identifier in the identifier storage;
a one time programmable storage in said memory storing boot code to boot the processor; and
wherein the boot storage includes instructions to perform a signature function on the boot code and to store a result of the signature function in the identifier storage,
said processor to:
execute verification code on reset;
retrieve an identifier and said code from said memory;
determine if the booting is a first;
if the booting is the first boot,
store the retrieved identifier in said identifier memory;
else compare the retrieved identifier with the stored identifier in said identifier storage; and
if the retrieved identifier and the stored identifier do not match,
prevent the processor from booting,
else compute a signature; and
determine if the computed signature matches a stored signature,
if the computed signature matches the stored signature,
permit booting from code in said memory,
else prevent the processor from booting.

2. The system of claim 1, wherein the memory is external to a semiconductor substrate or die.

3. The system of claim 1, wherein a size of the identifier storage is in a range from about 32 bits to about 128 bits.

4. The system of claim 1, wherein the boot storage is a read-only memory.

* * * * *